United States Patent [19]
Singh

[11] 3,781,829
[45] Dec. 25, 1973

[54] TEST PATTERN GENERATOR
[75] Inventor: Shanker Singh, Hyde Park, N.Y.
[73] Assignee: International Business Machines Corporation, Armonk, N.Y.
[22] Filed: June 16, 1972
[21] Appl. No.: 263,500

[52] U.S. Cl. 340/173 R, 340/173 AM, 340/173 BB
[51] Int. Cl. .................................. G11c 13/00
[58] Field of Search .............. 340/173 R, 173 BB, 340/173 AM

[56] References Cited
UNITED STATES PATENTS
3,444,526  5/1969  Fletcher .................. 340/173
3,588,830  6/1971  Duda ...................... 340/173

Primary Examiner—Terrell W. Fears
Attorney—Kenneth R. Stevens et al.

[57] ABSTRACT

A test pattern generator comprising a memory means for storing n test pattern numbers. The memory means is responsive to a selectively alterable address means for generating a plurality of distinct test pattern sequence of numbers from the n stored test pattern numbers.

9 Claims, 3 Drawing Figures

3,781,829

TEST PATTERN GENERATOR

BACKGROUND OF THE INVENTION

This invention relates to a test pattern generator, and more particularly to a test pattern generator ideally suited for testing large scale integrated circuits.

In the past, test pattern generators basically comprise a shift register and attendant logic feedback circuitry. The capacity of the shift register is determined essentially by a polynomial read into the shift register and the number of shift register stages. This type of scheme, however, possesses certain disadvantages. First, the capacity of the generator is dependent upon the number of shift register stages. Further, sophisticated and expensive logic circuitry is required in order to manipulate the data so as to generate a random test pattern sequence in combination with a fixed test pattern, sometimes required for certain large scale integrated circuit testing procedures. Moreover, the positioning of the known pattern with respect to the random pattern is extremely difficult, if not impossible, with the shift register approach.

SUMMARY OF THE INVENTION

Therefore, it is an object of the present invention to provide a test pattern generator which offers a high degree of testability, extendability, and flexibility for use in a large scale integrated circuit environment.

Another object of the present invention is to provide a test pattern generator which is speed compatible with the circuits under test so as to furnish an extremely high-speed testing mode of operation.

Another object of the present invention is to provide a test pattern generator having a large capacity which is readily implementable with relatively inexpensive large scale integrated memory arrays.

A further object of the present invention is to provide a test pattern generator capable of readily producing a test pattern sequence which includes both a positionable known fixed test pattern in combination with a random test pattern.

In accordance with the aforementioned objects, the present invention comprises a memory means having a plurality of storage locations for storing n test pattern numbers. Alterable address means connected to the memory means selectively delivers a variable address for generating a plurality of distinct test pattern sequence of numbers from the n stored test pattern numbers in the memory means.

The foregoing and other objects, features and advantages of the invention will be apparent from the following more particular description of the preferred embodiment of the invention as illustrated in the accompanying drawings.

DESCRIPTION OF THE PREFERRED EMBODIMENT

In the preferred emgodiment, the test pattern generator is described as comprising a read-write memory. That is, the hardware implementation is capable of writing as well as reading information from the memory array. However, it is to be realized that the memory array is also implementable in a read-only memory mode of operation, and thus would not require some of the hardware write implementation described in the preferred embodiment.

An X counter 10 is connected via a plurality of output lines 11, 12, 13 and 14 to an X writable decode circuit 16. The X counter 10 is adapted to receive a divided clock signal on line 18 and a reset signal on line 20. The X counter also furnishes a shift control pulse for reading the test patterns to the X writable decode circuit via output line 22.

Similarly, the Y counter 24 is connected to a Y writable decode circuit 26 via a plurality of output lines 27, 28, 29 and 30. The Y counter 24 is adapted to receive basic clock signals on input line 32 and a reset signal on line 34. The X decode also furnishes a shift control pulse to Y decoder for reading the test pattern. A data or address line to the X decoder is schematically shown at 40, and a data write or address line to the Y writable decode circuit is schematically shown at 42.

In the X direction, a plurality of memory arrays, designated A, are connected to the writable decode circuit 16 via a plurality of output lines 44, 46, 48 and 50. Similarly, in the Y direction, the writable decode circuit 26 is connected to the memory array means by way of a plurality of output lines 52, 54, 56 and 58.

In the read-write memory implementation, n test pattern numbers are read into the memory means via a plurality of input lines designated DATA IN. A plurality of distinct test pattern sequence of numbers are generated on the output lines from the plurality of memory means A on the output lines labelled OUTPUTS. A read-write control line to the plurality of memory means A is schematically shown at 60.

Figure 1:
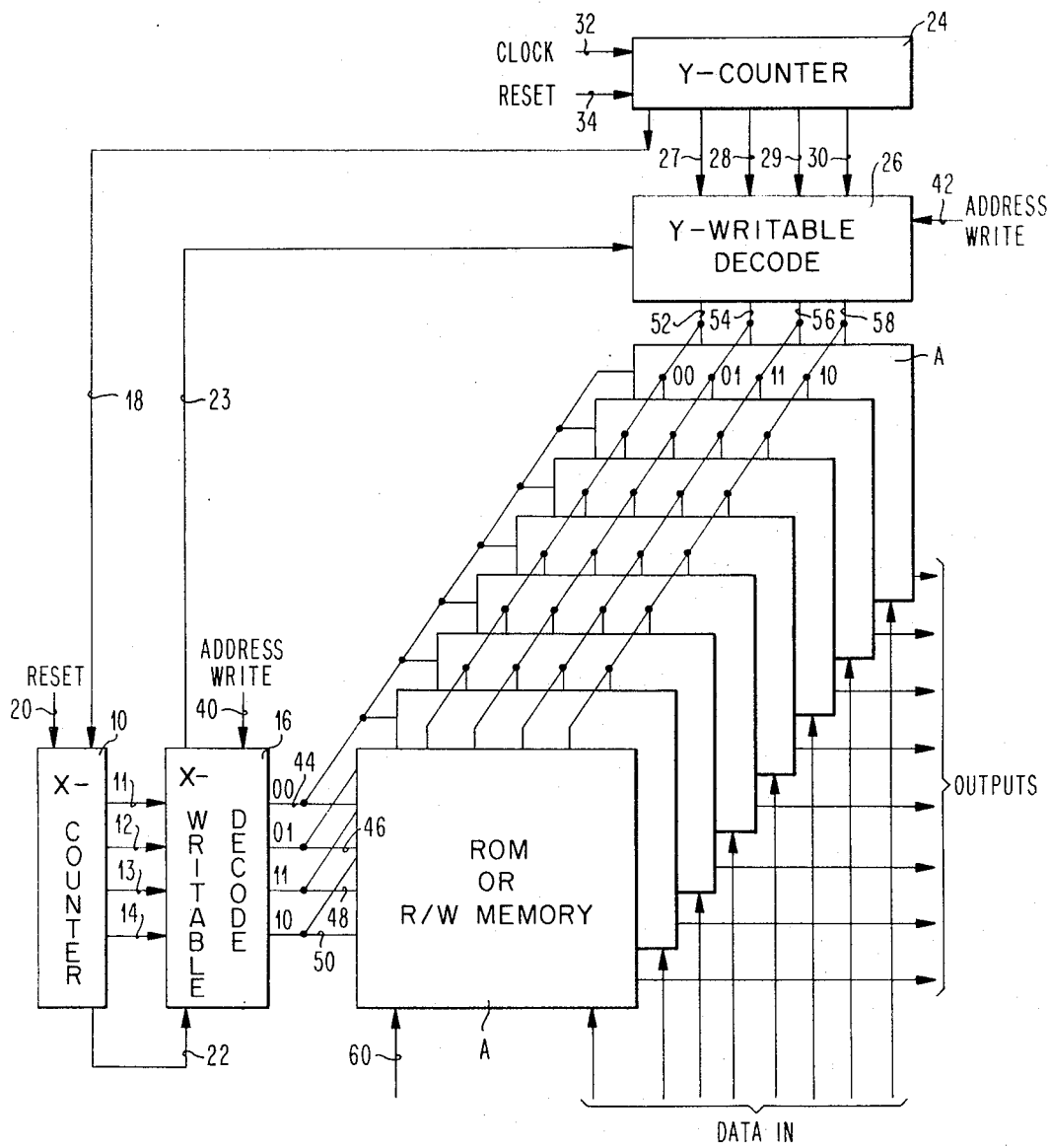
FIG. 1 is an electrical schematic block diagram illustrating the test pattern generator.
Figure 2:
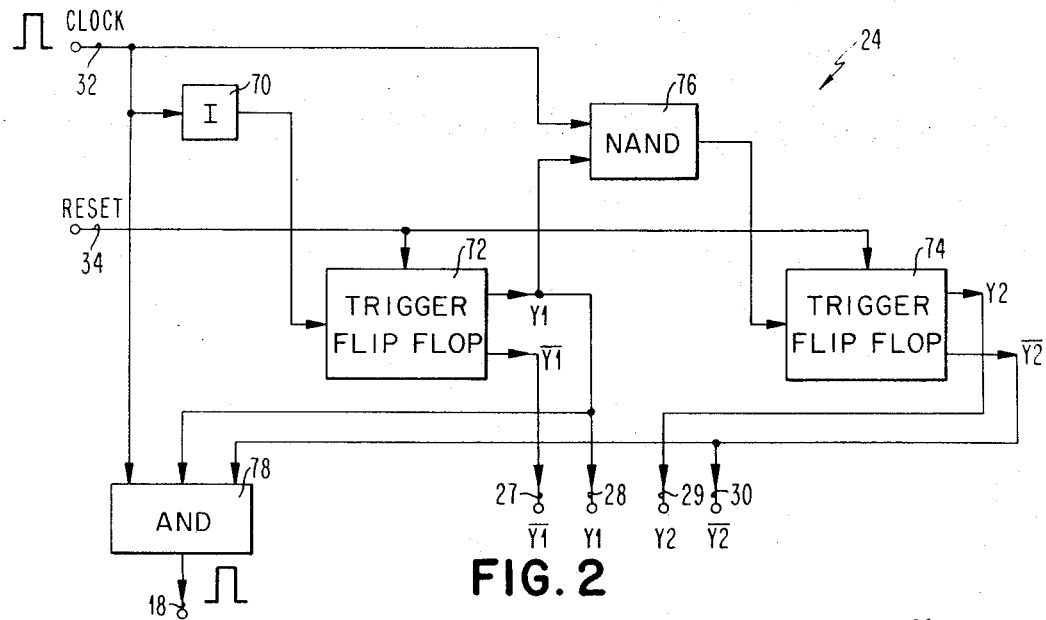
FIG. 2 is an electrical schematic block diagram illustrating one manner of implementing the X or Y counters shown generally in FIG. 1.

Now referring to FIG. 2, it illustrates one implementation for the Y counter 12 shown broadly in FIG. 1. Like reference numerals are employed in labelling FIG. 2 to indicate identical elements to those already shown in FIG. 1. Clock and reset signals are received by the counter 24 on lines 32 and 34, respectively. Counter output signals are generated on lines 27, 28, 29 and 30. The logical representation of the signals generated on the output lines are indicated as Y1, $\overline{Y1}$, Y2 and $\overline{Y2}$. The counter 24 further generates a shift control signal on line 18, and this line also connects to the X counter at a terminal or line which corresponds to the clock line specifically shown as 32 for the Y counter 24. In the specific embodiment, the counter is illustrated as being a modulo [4] counter, and thus, for every four input clock pulses received on line 32, a pulse output is generated on line 18 for selectively shifting the contents within the X counter 10. The details of the counter 10 do not form a part of the present invention, but merely represent conventional logic elements, namely, an invert circuit 70, a pair of trigger flip-flops 72 and 74, a NAND circuit 76, and an AND circuit 78 for providing a modulo [4] count and for providing a divided or separate pulse for every four received input pulses.

The X counter 10 is substantially identical to the structure and attendant function described with respect to counter 12. Output line 22 from counter 10 corresponds to the output line 18 from counter 24. That is, it is a control line for producing a divided pulse after a predetermined number of pulse inputs thereto. In the specific implementation of the preferred embodiment, that is, with both counters 10 and 12 comprising a modulo [4] counter, an output pulse is generated on line 22 for every sixteen input pulses to counter 24, since sixteen clock pulses must be received by counter 24 in order for counter 10 to receive four pulses via line 18. A pulse on line 22 shifts the personality of the X decoder 16 for every 16 pulses at line 32. Line 18 functions to apply a divided clock rate to its orthogonal counter 10. But, clearly the basic clock rate can be applied to counter 10, and in this instance, line 18 instead would apply a divided clock rate to counter 24. Similarly, another shift control pulse is produced on line 22 from X decoder 16 for every 64 clock pulses applied at 32. Line 23 is connected to the Y decoder 26, which shifts the personality of the Y decoder every 64 clock pulses.

Figure 3:
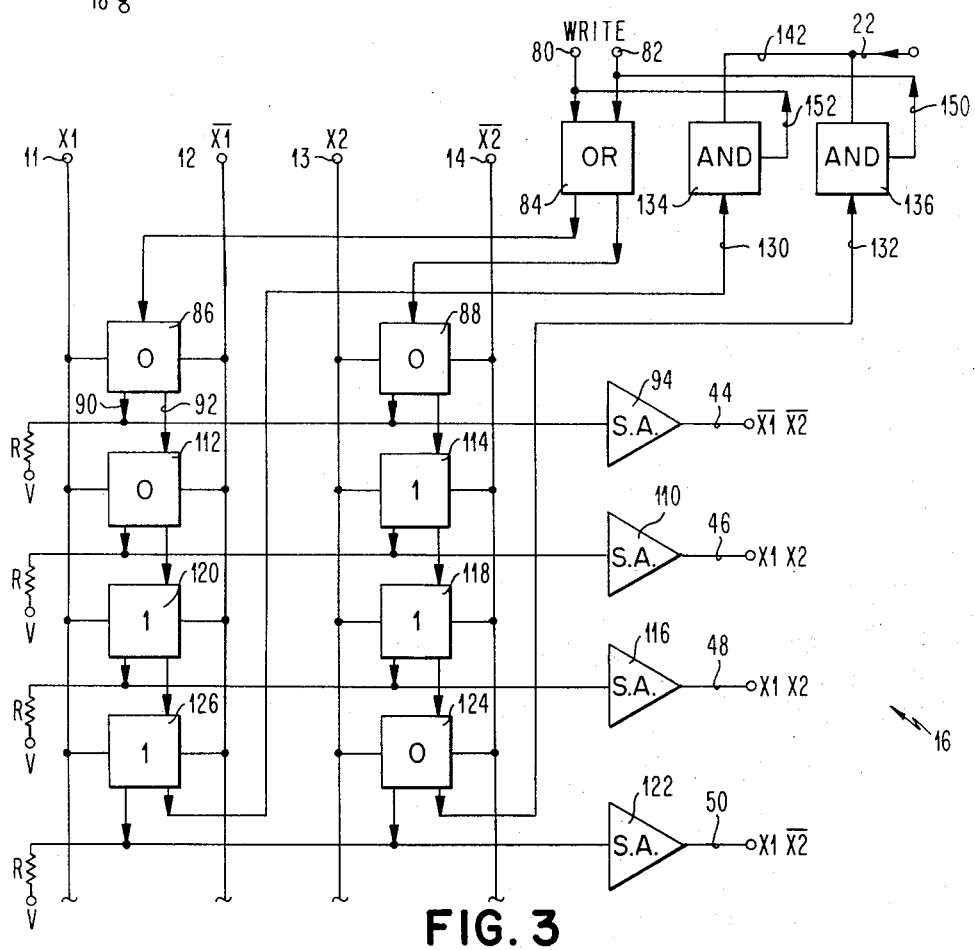
FIG. 3 is an electrical schematic diagram illustrating one manner of implementing the writable X or Y decoders shown in FIG. 1.

Now referring to FIG. 3, it illustrates one manner of implementing the alterable of writable decode circuit necessary for the present invention. The writable decoder circuit 16 is illustrated in detail, but it is to be understood that the writable decode circuit 26 is similarly constructed, but not specifically shown for purposes of simplicity.

In order to write information or an address into the writable decode circuit 16, a pair of write terminals 80 and 82, generally designated 40 in FIG. 1, are connected to an OR gate 84. Information applied to input write terminals 80 and 82 is transmitted via the OR gate 84 to a pair of input registers 86 and 88. As clearly depicted, the registers or storage cells are arranged such that the information stored in the register or cell can be read out on a pair of output terminals, for example, as depicted at 90 and 92. The output information on terminal 92 is transmitted to the adjacent column storage cell and thus allows information to be transferred vertically from one storage cell to another as information is serially applied to the write input terminals 80 and 82.

Similarly, information can be read from the writable decode circuit 16 upon the application of read signals X1, $\overline{X1}$, X2 and $\overline{X2}$. These signals are received at terminals 11, 12, 13 and 14 from the X counter 10, and are similarly generated as that previously described in connection with the generation of the Y1, $\overline{Y1}$, Y2 and $\overline{Y2}$ signals generated from the counter 24.

Information read from each of these storage cells is transmitted via an output line to an associated sense amplifier (S.A.), for example, as shown at 94, and then to its respective output terminal. Accordingly, once information is written into the writable decode circuit 26, a plurality of output terminals 44, 46, 48 and 50 are adaptable to generate the logic functions $\overline{X1}\,\overline{X2}$; $\overline{X1}\,X2$; $X1\,X2$; and $X1\,\overline{X2}$, corresponding respectively to the binary signals 00, 01, 11 and 10.

In a similar manner, the output line 46 is connected to its respective sense amplifier 110, and to a pair of storage cells 112 and 114; output terminal 48 to its respective sense amplifier 116 and to a pair of storage cells 118 and 120; and output terminal 150 to sense amplifier 122 and a pair of storage cells 124 and 126. A plurality of resistors R and a plurality of voltage sources V are merely schematic representations illustrating that the sense amplifiers require a driving source.

Information contained in the last pair of storage cells 124 and 126 is recycled or fed back to the input registers or storage cells 86 and 88 via a pair of lines 130 and 132 each connected to AND gates 134 and 136, respectively. The AND gates 134 and 136 also are adapted to receive gating pulses via line 142 which further connects to line 22 as previously depicted in FIG. 1. Accordingly, information stored in the final register 124 and 126 is selectively gated through their respective AND gates 136 and 134 and applied to the input OR gate 84 by way of lines 150 and 152.

Again, the specific details of the Y counter 24 are illustrated in conjunction with the specific details of the X writable decode circuit 16. For purposes of simplicity, the details of the counter 10 and the Y writable decode circuit 26 are not shown, but their manner of operation and structural implementation is clear from the description of their counterparts in the array organization.

As shown in the preferred embodiment, line 18 generates a pulse for every four clock pulses received on line 32, and similarly, line 22 generates a pulse for every sixteen pulses received on line 32 in order to shift the information in the writable decode circuit 16, in order to achieve the alterable mode of operation. If desired, logic circuitry (not shown) connected to the X writable decode and to the gating line 22 can be used to generate a pulse for every 64 received clock pulses on line 32 which in turn is fed back to the Y writable decode circuit 26 via line 23 in order to further increase the alterable capacity of the overall test pattern generator. However, such as adaption is merely an obvious modification of the basic invention, and a specific implementation is not shown in order to present applicant's invention in the most perspicuous manner.

OPERATION

In the read-write mode of operation, n test pattern numbers are applied to the DATA IN terminals in conjunction with the energization of read-write control terminal 60, FIG. 1. Many well known schemes are available in order to derive random test pattern numbers. Additionally, non-random numbers can also be stored in the plurality of memory means A along with the random set of numbers, depending upon the desired type of large scale integrated circuit test. In any event, the test pattern numbers are stored in the read-write memory at known storage locations.

FIG. 3 illustrates the manner of addressing the decode circuits 16 and 26. A pair of binary signals are simultaneously and sequentially applied to write terminals 80 and 82 in order to store the desired address in the decode circuits. In the given example, binary address 10 is stored in locations 126 and 124, binary address 10 in storage locations 120 and 118, binary address 01 in storage locations 112 and 114, and the binary address 00 in storage locations 86 and 88. The writable decode circuit 28 is addressed in a similar manner. In other words, a fixed address is stored in both the X and Y decoders 16 and 26, respectively. In the simplified version, the binary addresses applicable to the output lines from each of the decoders 16 and 26 are labelled, 00, 01, 11 and 10 for ease of explanation.

In order to read the first predetermined sequence of numbers from the plurality of memory means A, the clock line 32 is energized. Upon an initial application of power, the information stored in memory locations intersected by the X and Y binary 00 lines is delivered to the plurality of output terminals, schematically labelled OUTPUTS. During the first clock pulse applied to line 32, all the memory locations addressed by the binary 00 lines in the X direction and the binary 01 line in the Y direction are read out of memory. Upon the application of a second clock pulse to the Y counter, the plurality of output lines 27, 28, 29 and 30 similarly provide a read signal for energizing the binary 11 line in the Y direction and thus, all storage locations addressable by a binary 00 line in the X direction and a binary 11 line in the Y direction are read from memory. At a third clock pulse to the Y counter 24 via line 32, all storage locations addressed by the binary 10 line in the Y direction and the binary 00 line in the X direction have their contents delivered to the plurality of output lines labelled OUTPUTS.

At a fourth pulse, line 18 provides a pulse to X counter 10. The pulse to counter 10 generates output signals on lines 11 through 14, so as to energize the binary address line 01 in the X direction, and simultaneously resets or returns to energize the binary 00 address in the Y direction, and accordingly, all storage locations having a 01 address in the X direction and a 00 address in the Y direction are read from memory. At the next clock pulse, all storage locations having a 01 address in the X direction and a 01 address in the Y direction are read from memory. This reading from memory sequence continues in what is a fairly conventional manner until all storage locations capable of being addressed by the fixed address stored in the X and Y decode circuits 16 and 26 are read from memory.

Thus, the total test pattern numbers read from the memory by a fixed address stored in the X and Y decode circuits constitute a first given distinct test pattern sequence of numbers.

After 16 clock pulses are received on line 32, a pulse is generated on output line 22 from the counter 10. As more clearly shown in FIG. 3, this pulse is applied to line 142 so as to gate the information contained in registers 126 and 124 through AND gates 134 and 136 and into upper respective registers 88 and 86, so as to actually redefine the personality of the writable decode circuit 16. A binary address of 10 is now stored in locations 86 and 88, address 00 is now stored in locations 112 and 114, a binary address of 01 is now stored in locations 120 and 118, and a binary address of 11 is now stored in locations 126 and 124. Hence, as the Y counter 24 sequentially receives the next sequence of clock pulses in a manner similar to that previously described, the respective Y counter in conjunction with its Y decode circuit 26 and the X counter 10 in conjunction with its X decode circuit 16 are effective to read a separate and distinct test pattern sequence of numbers from the plurality of memory means due to the alterable nature of the decode circuitry.

After another sixteen clock pulses are received on line 32, the storage address of the decode circuit 16 is again altered, and another distinct and separate test pattern sequence of numbers is generated from the initial n stored test pattern numbers.

As previously mentioned, the alterability feature can further be extended so as to begin altering the personality of the decode circuit 26 after 64 pulses by the addition of very simplified logic circuitry, but again it is not shown for purposes of brevity.

It is thus seen that this test pattern generator is capable of generating a very large number of distinct test pattern sequence of numbers while requiring only an initial storage of n test pattern numbers. Since the initial n stored test pattern numbers are located in known storage addresses, the test pattern generator is also capable of readily producing a test pattern sequence which includes both a positionable known fixed test pattern group of numbers in combination with a random test pattern group of numbers. The simplified version is limited to a basic four-by-four type of array in a plurality of planes, but it is evident that the overall capacity of the present invention can be almost infinitely increased in accordance with the capacity of the counter, decode and memory elements.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. A test pattern generator comprising:
   a. memory means having a plurality of fixed storage locations for storing a plurality of $n$ test pattern numbers,
   b. address storage means connected to said memory means and having input terminals for receiving an original fixed address signal, and being responsive to said original fixed address signal for generating a first test pattern sequence of numbers from said plurality of $n$ test pattern numbers stored in said plurality of fixed storage locations,
   c. said address storage means further including control means for firstly altering the state of said original fixed address signal for generating a first unique address signal, and sequentially thereafter being sequentially responsive to said control means for generating a successive sequence of m unique address signals by successively altering a preceding unique address signal, and
   d. said memory means being responsive to said first unique address signal and to each of said m successive sequence of new address signals for generating $m+1$ mutually distinct test patterns sequence of numbers from said plurality of $n$ test pattern numbers stored in said plurality of fixed storage locations.

2. A test pattern generator as in claim 1 wherein said address storage means comprises:
   a. an X writable decode circuit connected to said memory means and a Y writable decode circuit connected to said memory means.

3. A test pattern generator as in claim 2 further including:
   a. means for writing said original fixed address signal into said X and Y writable decode circuits.

4. A test pattern generator as in claim 3 wherein:
   a. said control means further includes counter means connected to said X and Y writable decode circuits and being adapted to receive a series of basic clock pulses, said counter means and said X and Y writable decode circuits being responsible to a basic series of clock pulses for selectively reading said first test pattern sequence of numbers from said plurality of n test pattern numbers stored in said plurality of fixed locations.

5. A test pattern generator as in claim 4 wherein:

a. said counter means further includes circuit means responsive to another clock rate lower than the basic clock rate for selectively altering the states of said X and Y writable decode circuits for generating said first unique address signal and said successive sequence of $m$ unique address signals for reading said $m+1$ test pattern sequence of numbers from said memory means.

6. A test pattern generator as in claim 5 wherein:

a. said counter means comprises an X counter connected to said X writable decode circuit, and a Y counter connected to said Y writable decode circuit.

7. A test pattern generator as in claim 6 wherein:

a. said X and Y counters each include circuit means for generating respective clock rates lower than the basic clock rate, and interconnection means between said X counter, said X writable decode circuit, said Y counter, and said Y writable decode circuit for applying the reduced clock rates to said X and Y writable decode circuits for selectively generating variable addresses therein comprising said first unique address signal and said successive sequence of $m$ unique address signals.

8. A test pattern generator as in claim 7 wherein:

a. said memory means comprises a read-only memory means.

9. A test pattern generator as in claim 7 wherein:

a. said memory means comprises a read-write memory means.

* * * * *